Brown & Keith,
Coupling Jack,
No. 107,656. Patented Sep. 27, 1870.

Witnesses:

Inventor:
Henry A. Brown
Ethan B. Keith
by their attorney in fact
George Johnson

United States Patent Office.

HENRY A. BROWN AND ETHAN B. KEITH, OF GALESBURG, MICHIGAN.

Letters Patent No. 107,656, dated September 27, 1870.

IMPROVEMENT IN COUPLING-JACKS.

The Schedule referred to in these Letters Patent and making part of the same.

We, HENRY A. BROWN and ETHAN B. KEITH, both of Galesburg, in the county of Kalamazoo and State of Michigan, have invented certain Improvements in the Mode of Transmitting Motion to Shafts, adjustable to any desired angle with the leading shaft, which invention we call "A Universal Coupling-Jack," and of which the following is a specification.

Our invention relates to the employment of a circular-recessed case or frame, (in which is sunk an intermediate double-cogged bevel-wheel, one face of which gears with a pinion-shaft hung to said case,) in combination with an adjustable ring-frame, carrying another shaft and pinion, gearing with the opposite cogs of the intermediate wheel, said ring-frame being adjustably secured by set-bolts within a circular seat formed in said case in such manner that the one shaft may be adjusted radially in the casing at any desired angle with the other, vertically, horizontally, or both, for portable or stationary uses.

Similar letters of reference indicate corresponding parts in both figures.

A is a circular or disk-like cast-iron case or frame, recessed centrally to receive the intermediate bevel-wheel B, cogged on two faces, and carried on a shaft, C, one journal only of said shaft working in a bearing formed in the center of the case, as at $b$, the other journal working in a bearing, $b'$, formed in the center of one or more arms, $c$, of a ring-frame, D, to be presently described.

In addition to the central recess for the intermediate wheel, an adjacent circular rabbeted seat is formed in the casing A, leaving an external rim, $r$, within which the ring-frame D of cast-iron is snugly enclosed, or rather surrounded, with sufficient freedom to permit its being revolved in its seat.

The ring-frame is provided with two elevated bearings, $a$, on its outer face, in which bearings a shaft, E, (extending radially across the center,) revolves, and a similar, but shorter, shaft, F, revolves in similar bearings on the lower or outer face of the case A.

Each of the shafts E and F carry a matched bevel-wheel or pinion, P, to engage respectively with the geared faces of the intermediate wheel B, an opening being cut through the casing to admit a part of the body of the pinion on the shaft F.

Either one of said shafts may be the driver, and the gearing may, of course, be so proportioned as to transmit a slower, faster, or equal motion to the shaft driven from the intermediate.

The ring-frame, carrying with it the shaft E, may be firmly secured to the case, in any desired position, by set-bolts $i$ $i$, &c., screwed through the rim against the edge of the ring, but in this way it is best to point bluntly the ends of the bolts, and have the bolts abut against a beveled edge, having a tendency to keep the ring-frame pressed firmly down to its seat.

Figure 1:
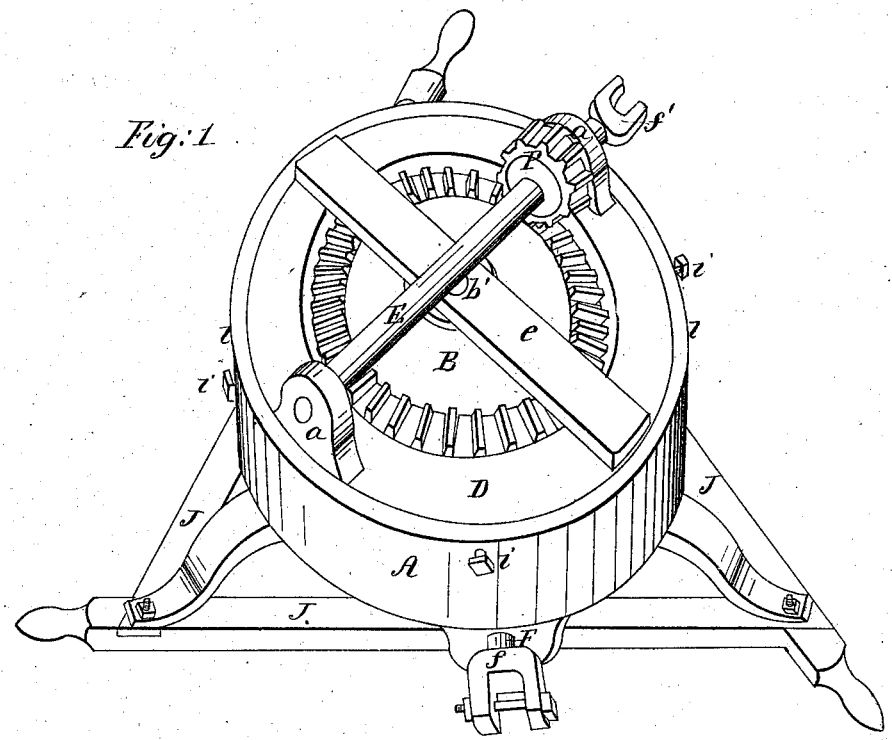
Figure 1 is a perspective view embodying our invention as mounted on a bed-frame for portable uses.
Figure 2:
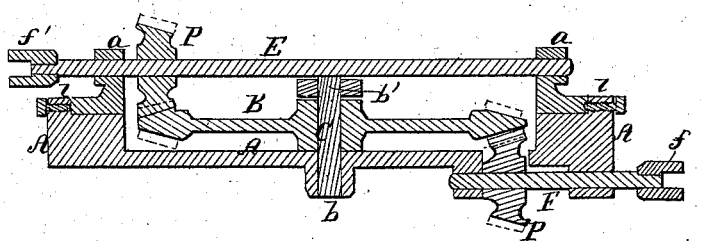
Figure 2 is a central cross-section, the two shafts being shown in a line coincident with each other.

The jack, shown in fig. 1, is mounted on framed bed-sills, J, for staking down between a sweep horse-power and a thrashing or other portable machine, the tumbling-rod of the power being jointed to the coupling-fork $f$ and the machine-connection to the fork $f'$. but for a belt used to drive the machine, the shaft E will of course be furnished with a band-wheel in place of the coupling.

For thrashing or other portable uses, the machine will always be located in the most favorable position for its work, and that position will necessarily determine approximately the location of the jack, according to the nature of the connection.

Now, by the use of our improved jack, the third point, viz., the position of the power, is not an arbitrary one, as in the ordinary arrangement, but may be selected to suit the ground at any point within the circumference of a circle, the radius of which is equal to the length of the tumbling-rod connection.

Therefore, to adjust the shaft E to coincide with the machine, and the shaft F to coincide with the power, the ring-frame D is revolved in its seat within the case A, until the two shafts assume the proper angle with each other, when the connections may be made, the power and jack staked down, and the ring-frame secured in place by tightening up the set-bolts.

The utility of this universal adjustment may be readily seen when it is considered that portable sweep-powers can seldom be conveniently or suitably set down in a right line, or at a right angle with the machine to be driven.

For use in shops, to transmit motion and power to shafts or belts, in any required direction, our jack may be mounted between hangers, or in any suitable frame, adjustable or not, as the arrangement is strong, simple, and compact, and works equally well in whatever position it may be placed.

We claim as our invention—

A jack, for transmitting motion and power, composed of the gear-shafts E F, intermediate wheel B, circular case A, and adjustable ring-frame D, in combination with each other, and any suitable bed-sills, or other frame, when arranged and operated substantially as and for the purpose set forth.

HENRY A. BROWN.
ETHAN B. KEITH.

Witnesses:
R. G. SMITH,
K. H. BARBER.